United States Patent
Gosla et al.

(10) Patent No.: US 9,933,955 B1
(45) Date of Patent: Apr. 3, 2018

(54) POWER SAFE WRITE BUFFER FOR DATA STORAGE DEVICE

(71) Applicant: Western Digital Technologies, Inc., Irvine, CA (US)

(72) Inventors: Asif F. Gosla, Irvine, CA (US); Vijiyendran Subramaniam, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 44 days.

(21) Appl. No.: 14/639,555

(22) Filed: Mar. 5, 2015

(51) Int. Cl.
*G06F 3/06* (2006.01)

(52) U.S. Cl.
CPC .......... *G06F 3/0617* (2013.01); *G06F 3/0656* (2013.01); *G06F 3/0685* (2013.01); *G06F 2003/0691* (2013.01)

(58) Field of Classification Search
CPC .. G06F 12/0811; G06F 12/0815; G06F 12/08; G06F 3/0617; G06F 3/0656; G06F 3/0685
USPC .......... 711/143, 112, 113, 130, 122
See application file for complete search history.

(56) References Cited

U.S. PATENT DOCUMENTS

| | | | |
|---|---|---|---|
| 5,448,719 A | 9/1995 | Schultz et al. | |
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |
| 6,279,089 B1 | 8/2001 | Schibilla et al. | |
| 6,289,484 B1 | 9/2001 | Rothberg et al. | |
| 6,292,912 B1 | 9/2001 | Cloke et al. | |

(Continued)

*Primary Examiner* — Pierre Miche Bataille
(74) *Attorney, Agent, or Firm* — Barry IP Law

(57) ABSTRACT

Data from a host is received into a volatile memory of a Data Storage Device (DSD) for storage on a disk of the DSD. Data received in the volatile memory from the host is identified for inclusion in a Power Safe Write Buffer (PSWB) and an indication is sent to the host indicating storage of data received from the host and identified for inclusion in the PSWB before storing the identified data on the disk. In the event of an unexpected power loss of the DSD, the identified data is transferred from the volatile memory to a Non-Volatile Solid-State Memory (NVSM) of the DSD.

23 Claims, 6 Drawing Sheets

(56) References Cited

U.S. PATENT DOCUMENTS

| | | |
|---|---|---|
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,668,336 B2 * | 12/2003 | Lasser .............. G06F 11/1435 714/15 |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |

(56) References Cited

U.S. PATENT DOCUMENTS

| | | |
|---|---|---|
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,468,682 B2 * | 12/2008 | Altare .............. G11B 20/10527 341/50 |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,041,895 B2 * | 10/2011 | Kern .................. G06F 11/1441 711/103 |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |

(56) References Cited

U.S. PATENT DOCUMENTS

| | | |
|---|---|---|
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,631,198 B2 | 1/2014 | Bay et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,725,946 B2 * | 5/2014 | Petersen .............. G06F 3/0611 361/760 |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 9,177,638 B2 * | 11/2015 | Danilak .................. G11C 11/16 |
| 9,274,937 B2 * | 3/2016 | Batwara .............. G06F 3/0608 |
| 9,323,670 B2 * | 4/2016 | Krishnamurthy ... G06F 12/0868 |
| 2009/0113702 A1 | 5/2009 | Hogg |
| 2009/0193189 A1 * | 7/2009 | Carswell ............ G06F 11/1441 711/113 |
| 2009/0193193 A1 * | 7/2009 | Kern .................. G06F 11/1441 711/128 |
| 2010/0306551 A1 | 12/2010 | Meyer et al. |
| 2011/0226729 A1 | 9/2011 | Hogg |
| 2012/0151162 A1 * | 6/2012 | Trantham .................. G06F 1/30 711/161 |
| 2012/0159042 A1 | 6/2012 | Lott et al. |
| 2012/0239860 A1 * | 9/2012 | Atkisson ............ G06F 12/0246 711/103 |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0133220 A1 * | 5/2014 | Danilak .................. G11C 11/16 365/158 |
| 2014/0201424 A1 | 7/2014 | Chen et al. |
| 2015/0006834 A1 * | 1/2015 | Dulloor .................. G06F 3/0604 711/162 |
| 2015/0100820 A1 * | 4/2015 | Faulhaber ............ G06F 11/1441 714/6.12 |
| 2015/0155050 A1 * | 6/2015 | Trantham ............ G11C 16/3418 365/185.03 |
| 2015/0178202 A1 * | 6/2015 | Sankaran ............ G06F 12/0811 711/122 |

\* cited by examiner

POWER SAFE WRITE BUFFER FOR DATA STORAGE DEVICE

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD). Another type of storage media can include a solid-state memory where cells are charged to store data.

In writing data to a disk, a DSD may temporarily store the data in a volatile memory before the data is written to the disk. In some cases, the volatile memory can be used as a write cache to queue or defer write commands received from a host until a more beneficial time from a performance perspective of the DSD. Such a mode of deferring write commands can be referred to as a Write Cache Enable (WCE) mode of performing write commands. In such a WCE example, the DSD may notify the host of the performance of the write command after the write command has been queued in the volatile memory but before the write command is actually performed on the disk. Although this arrangement can ordinarily allow for an improved performance from the perspective of the host, the write commands in the volatile memory are usually lost in the event of an unexpected power loss at the DSD.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
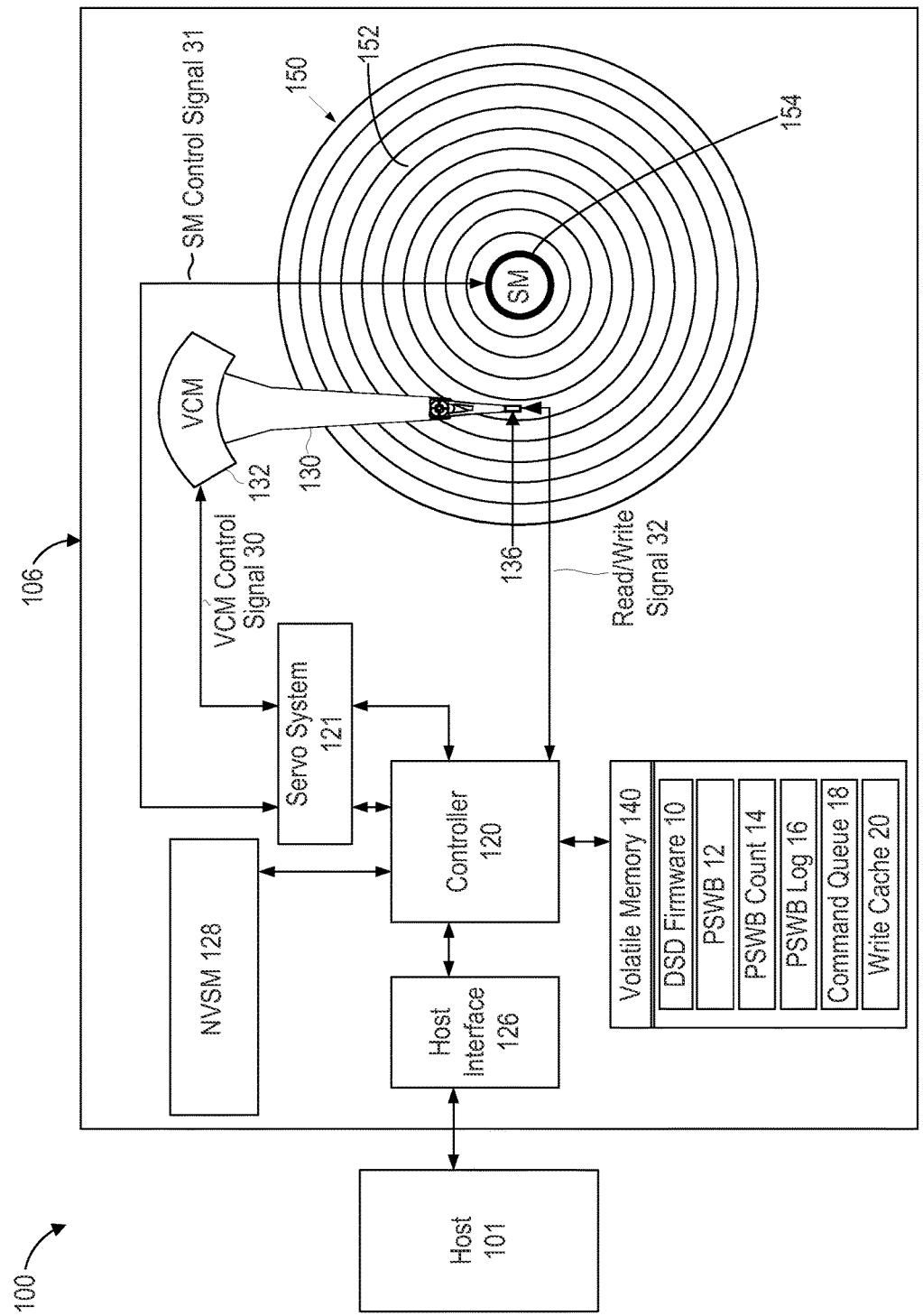
FIG. 1 is a block diagram depicting a Data Storage Device (DSD) according to an embodiment.

FIG. 1 depicts a block diagram of Data Storage Device (DSD) 106 according to an embodiment where DSD 106 includes Non-Volatile Memory (NVM) in the form of rotating magnetic disk 150 and Non-Volatile Solid-State Memory (NVSM) 128. In this regard, DSD 106 can be considered a Solid-State Hybrid Drive (SSHD) since it includes both solid-state and disk media. In other embodiments, each of disk 150 or NVSM 128 may be replaced by multiple Hard Disk Drives (HDDs) or multiple Solid-State Drives (SSDs), respectively, so that DSD 106 includes pools of HDDs and/or SSDs.

DSD 106 includes controller 120 which includes circuitry such as one or more processors for executing instructions and can include a microcontroller, a DSP, an ASIC, an FPGA, hard-wired logic, analog circuitry and/or a combination thereof. In one implementation, controller 120 can include a system on a chip (SoC).

Host interface 126 is configured to interface DSD 106 with host 101 and may interface according to a standard such as, for example, Serial Advanced Technology Attachment (SATA), PCI express (PCIe), Small Computer System Interface (SCSI), or Serial Attached SCSI (SAS). As will be appreciated by those of ordinary skill in the art, host interface 126 can be included as part of controller 120. Although FIG. 1 depicts the co-location of host 101 and DSD 106, in other embodiments the two need not be physically co-located. In such embodiments, DSD 106 may be located remotely from host 101 and connected to host 101 via a network interface.

In the example of FIG. 1, disk 150 is rotated by a Spindle Motor (SM) 154 and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks 152. Servo system 121 controls the rotation of disk 150 with SM control signal 31 and controls the position of head 136 using VCM control signal 30.

DSD 106 also includes NVSM 128 for storing data across power cycles. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

As shown in FIG. 1, DSD 106 includes volatile memory 140, which can include, for example, a Dynamic Random Access Memory (DRAM). Volatile memory 140 can be used by DSD 106 to temporarily store data. Data stored in volatile memory 140 can include data read from NVM such as disk 150 or NVSM 128, data to be stored in NVM, instructions loaded from DSD firmware 10 for execution by controller 120, and/or data used in executing DSD firmware 10. Volatile memory 140 can also be used to temporarily store data for write commands intended for disk 150.

In the example of FIG. 1, volatile memory 140 also stores Power Safe Write Buffer (PSWB) 12, PSWB count 14, PSWB log 16, command queue 18, and write cache 20. As discussed in more detail below, data included in PSWB 12 is transferred to NVSM 128 in the event of an unexpected power loss of DSD 106. In one implementation, kinetic energy from the rotation of SM 154 can be used to temporarily power NVSM 128 to facilitate the transfer of data from volatile memory 140 to NVSM 128. The transfer of data to NVSM 128 ordinarily prevents loss of the data included in PSWB 12.

In addition, DSD 106 can notify host 101 that write commands for data identified for inclusion in PSWB 12 has been stored before actually storing the identified data on disk 150. This ordinarily allows for an improved performance of DSD 106 in terms of the number of host commands that can be performed in a given period of time (e.g., increased Input/Output Operations Per Second (IOPS)) and a reduced latency in performing the commands from the perspectives of both host 101 and DSD 106. In more detail, more write commands can be queued for performance in command queue 18 (an increased queue depth) which increases IOPS and reduces latency from the perspective of host 101 to allow host 101 to send more write commands to DSD 106. From the perspective of DSD 106, having more commands in command queue 18 can reduce the overall mechanical latency in performing the queued commands by using a Rotational Position Optimization (RPO) algorithm that rearranges the order for performing the commands to reduce the movement of head 136 over disk 150 in performing the commands. The use of PSWB 12 can therefore improve the efficiency in performing write commands, while still protecting the data for the write commands in the event of an unexpected power loss.

In one implementation, data for performing host write commands is stored in write cache 20 and some or all of the data from write cache 20 is identified or marked through the use of a flag or other indicator as being included in PSWB 12. Controller 120 keeps track of the amount of data identified for inclusion in PSWB 12 with the use of PSWB count 14. The amount of data that can be included in PSWB 12 can be based on an amount of data that can be transferred from volatile memory 140 to NVSM 128 after an unexpected power loss. This amount may be based on an energy budget that considers the energy available from the spinning of disk 150 and the energy needed to transfer data from volatile memory 140 to NVSM 128. In one implementation, controller 120 can compare PSWB count 14 to a number of sectors on disk 150 representing a maximum amount of data that could be safely transferred to NVSM 128 in the event of a power loss. In some implementations, use of PSWB 12 is temporarily disabled when the rotation of disk 150 falls below a threshold rotational speed such as during a low speed or a low power mode of disk 150.

In operation, host interface 126 receives host read and write commands from host 101 via host interface 126 for reading data from and writing data to NVM. In response to a write command from host 101, controller 120 may queue the write commands in command queue 18 and buffer the data to be written for the write commands in PSWB 12 or write cache 20.

For data to be written on disk 150, a read/write channel (not shown) of controller 120 may encode the buffered data into write signal 32 which is provided to head 136 for magnetically writing data on disk 150. Servo system 121 can provide VCM control signal 30 to VCM 132 to position head 136 over a particular track 152 for writing the data.

In response to a read command for data stored on disk 150, servo system 121 positions head 136 over a particular track 152. Controller 120 controls head 136 to magnetically read data stored in the track and to send the read data as read signal 32. A read/write channel of controller 120 can then decode and buffer the data into volatile memory 140 for transmission to host 101 via host interface 126.

For data to be stored in NVSM 128, controller 120 receives data from host interface 126 and may buffer the data in volatile memory 140. In one implementation, the data is then encoded into charge values for charging cells (not shown) of NVSM 128 to store the data.

In response to a read command for data stored in NVSM 128, controller 120 in one implementation reads current values for cells in NVSM 128 and decodes the current values into data that can be transferred to host 101 via host interface 126.

Power Safe Write Buffer Examples

Figure 2:
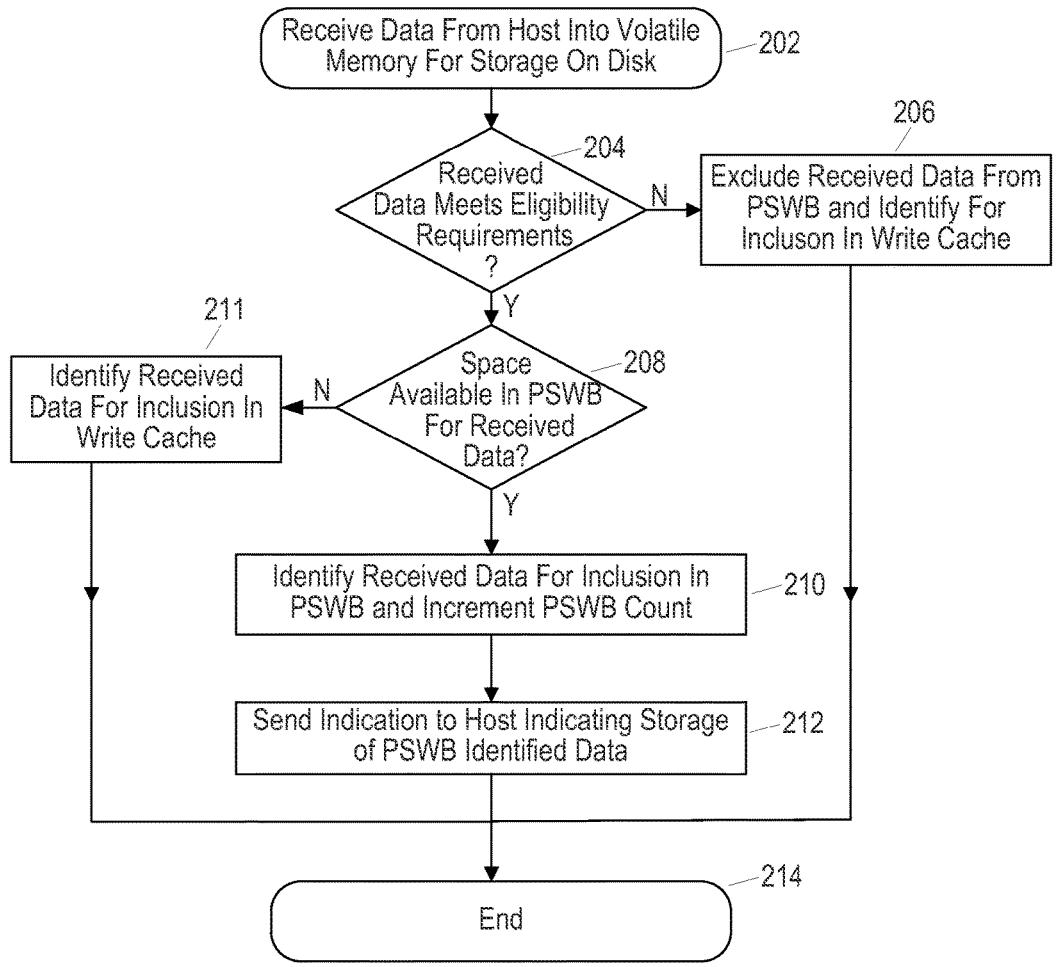
FIG. 2 is a flowchart for management of a Power Safe Write Buffer (PSWB) after receiving data from a host according to an embodiment.

FIG. 2 is a flowchart for management of a PSWB that can be performed by controller 120 executing DSD firmware 10 according to an embodiment. In block 202, controller 120 receives data from host 101 via host interface 126 for storage on disk 150. The received data may form part of a write command from host 101 to store data on disk 150.

In block 204, controller 120 determines whether the received data meets certain eligibility requirements for PSWB 12. Since the capacity of PSWB 12 is limited, controller 120 in one implementation can check the data as it is received for whether the data is eligible for PSWB 12. In one implementation, controller 120 checks whether the received data is larger than a predetermined size that may consume too much space in PSWB.

In another implementation, controller 120 checks in block 204 whether the received data is considered sequential to a certain degree (e.g., sequentially addressed beyond a certain number of logical addresses). If the data is considered sufficiently sequential, the performance benefit of storing the sequential data in PSWB 12 may not be as great as storing other data in PSWB 12 that is to be written in more random locations on disk 150. In other words, the reordering of command queue 18 by an RPO algorithm can have a greater effect on random writes than on sequential writes. Sequentially addressed data can usually be efficiently written with a sequential write such that head 136 does not need to be repositioned to distant portions of disk 150. Other implementations may consider both the size of the received data and whether the data is sequentially addressed to a certain degree. Yet other implementations may consider different eligibility requirements in block 204.

If controller 120 determines in block 204 that the received data does not meet the eligibility requirements for PSWB 12, controller 120 in block 206 excludes the received data from PSWB 12 and identifies the received data for inclusion in write cache 20. Data can be identified or inclusion in write cache 20 with a flag or other indicator of inclusion in write cache 20. In such an implementation, the flag or other indicator can prevent the received data from future inclusion in PSWB 12 in an embodiment where controller 120 can add data from write cache 20 into PSWB 12 as discussed in more detail below with reference to FIG. 3. In other implementations, inclusion of the received data in write cache 20 can be a default such that the absence of a flag or indicator of inclusion in PSWB 12 identifies the received data as included in write cache 20. The process of FIG. 2 then ends in block 214.

If controller 120 determines in block 204 that the received data meets the eligibility requirements (e.g., received data is less than a predetermined size and/or not sequentially addressed), controller 120 determines in block 208 whether there is space available in PSWB 12 for the received data. Controller 120 may compare the size of the received data, for example, in terms of a number of data blocks or a number of sectors and compare the size to an available space in PSWB 12 based on PSWB count 14. In one implementation, PSWB count 14 can provide controller 120 with the amount of data (e.g., a number of data blocks or sectors) already included in PSWB 12. Controller 120 can then compare the PSWB count 14 to a maximum amount of data that can be included in PSWB 12 to determine whether there is room to include the received data in PSWB 12. In other implementations, PSWB count 14 may represent a remaining available space in PSWB 12 rather than the amount of data already included in PSWB 12. If there is not enough room in PSWB 12, the received data is identified for inclusion in write cache 20 in block 211 and the process ends in block 214. This may be accomplished by using a flag or indicator to associate the received data with write cache 20, or the absence of a flag or indicator of inclusion in PSWB 12 can serve in some implementations as identifying the received data for inclusion in write cache 20.

If it is determined in block 208 that there is enough space available in PSWB 12, controller 120 in block 210 identifies the received data for inclusion in PSWB 12 and increments PSWB count 14 to account for the inclusion of the received data in PSWB 12. In block 212, an indication is sent to host 101 to indicate storage of the received data identified for inclusion in PSWB 12 and the process ends in block 214. As noted above, sending this indication can ordinarily improve a performance of system 100 in that host 101 can proceed with sending other write commands to DSD 106 and DSD 106 can make greater use of an RPO algorithm in reordering a larger number of commands in command queue 18.

Figure 3:
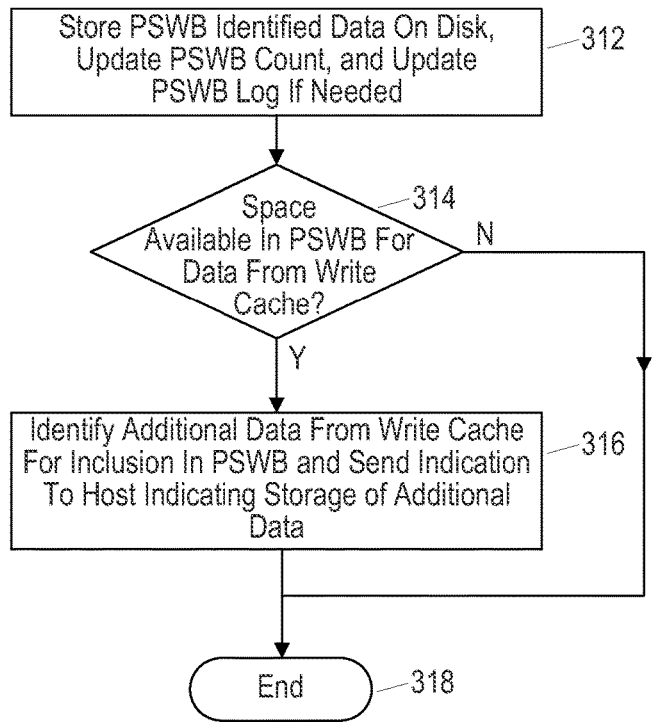
FIG. 3 is a flowchart for management of a PSWB after storing PSWB identified data on a disk according to an embodiment.

FIG. 3 is a flowchart for management of a PSWB after storing PSWB identified data on a disk according to an embodiment. In one implementation, the process of FIG. 3 can be performed by controller 120 executing DSD firmware 10. In block 312, controller 120 stores data on disk 150 that has been identified for inclusion in PSWB 12. After storing the data on disk 150, controller 120 updates PSWB count 14 to reflect that the data is no longer included in PSWB 12. In implementations where PSWB count 14 represents an available space in PSWB 12, controller 120 may increase PSWB count 14. In implementations where PSWB count 14 represents the amount of data included in PSWB 12, controller 120 may decrease PSWB count 14. Controller 120 in block 312 may also update PSWB log 16, if needed, to reflect that the data has been stored on disk 150. PSWB log 16 can be used by controller 120 to indicate which of the data in PSWB 12 has been stored on disk 150 since a power-up of DSD 106. As discussed in more detail below with reference to FIG. 6A, PSWB log 16 can provide a way to maintain coherency between PSWB 12 and disk 150 in the event of successive power losses where not all of the data from PSWB 12 can be written to disk 150 before a next power loss.

In block 314, controller 120 determines whether there is space available in PSWB 12 to include additional data from write cache 20. The determination may also include determining whether additional data in write cache 20 meets eligibility requirements for PSWB 12 such as the size of the additional data or the degree of sequential addressing. In addition, data in write cache 20 that has already been identified as excluded from PSWB 12 may not be considered in block 314.

If it is determined in block 314 that there is no space for including additional data from write cache 20, the process ends at block 318. In this regard, there may not be any eligible data in write cache 20 or all eligible data may be too large to fit into the remaining space for PSWB 12.

If it is determined in block 314 that there is space available in PSWB 12, controller 120 in block 316 identifies the additional data for inclusion in PSWB 12 and sends an indication to host 101 indicating storage of the additional data. The process then ends in block 318.

By adding more data to PSWB 12 from write cache 20, a system performance can ordinarily be improved since notification of the storage of the additional data can be sent sooner to host 101. In addition, including additional data from write cache 20 in PSWB 12 can also help protect or back-up the additional data from loss. In a case where the additional data from write cache 20 has been written in a Write Cache Disable (WCD) mode, host 101 is not notified of the storage of data from write cache 20 until the data has been written on disk 150. In this case, adding data from write cache 20 into PSWB 12 can also reduce the amount of recovery that host 101 may need to perform after an unexpected power loss.

In an implementation where an RPO algorithm is not performed on commands for data in write cache 20, adding data from write cache 20 into PSWB 12 can also improve the efficiency of DSD 106's write performance, especially when there may be a shortage of incoming write commands from host 101. This is discussed in more detail below with reference to FIG. 4.

Figure 4:
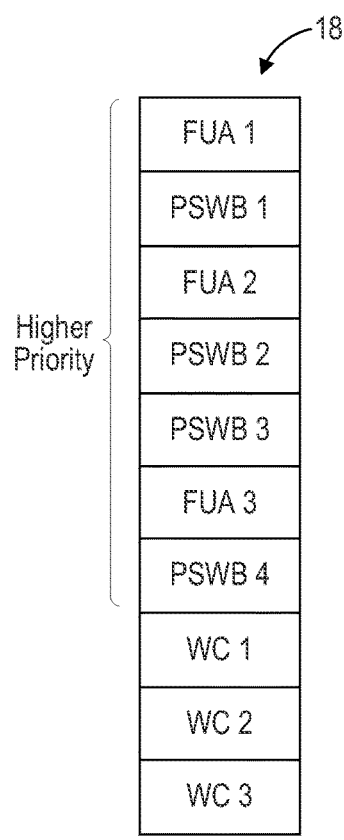
FIG. 4 is a diagram illustrating a command queue according to an embodiment.

FIG. 4 is a diagram illustrating an example of command queue 18 according to an embodiment. Command queue 18 can include a number of write commands queued for writing on disk 150. In the example of FIG. 4, the order of performance for the write commands in command queue 18 starts with Forced Unit Access (FUA) command 1 at the top of command queue 18 and ends with Write Cache (WC) command 3 at the bottom of command queue 18. FUA commands 1 to 3 and commands corresponding to data stored in PSWB 12 (i.e., PSWB commands 1 to 4) are prioritized over commands corresponding to data stored in write cache 20 (i.e., WC commands 1 to 3). FUA commands can be given a high priority by an application or file system of host 101 to help ensure that certain data is quickly written to disk 150. In other embodiments, command queue 18 may only include PSWB commands and WC commands without FUA commands.

The PSWB commands are given a higher priority over the WC commands to make better use of the performance benefit offered by PSWB 12 in notifying host 101 of the storage of data in PSWB 12 before it is stored on disk 150. In addition, an RPO algorithm can be performed on the higher priority FUA and PSWB commands to reorder the order of performance of the FUA and PSWB commands with respect to each other.

Figure 5:
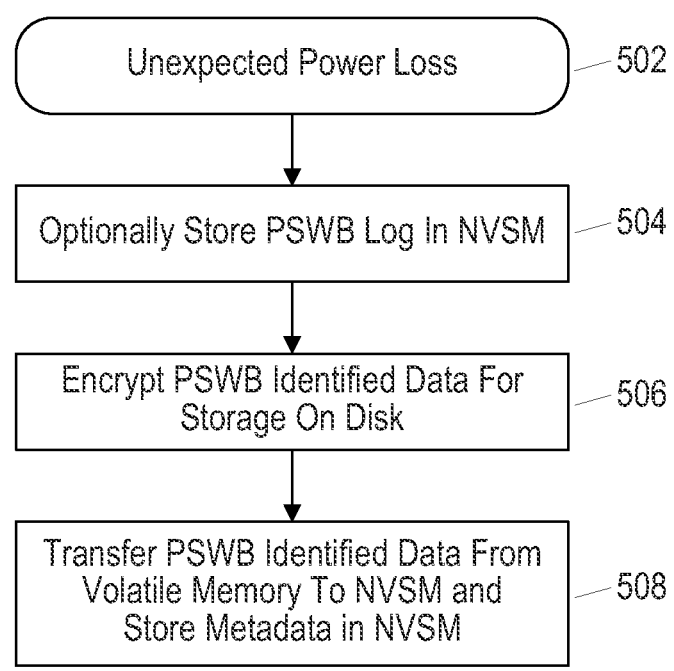
FIG. 5 is a flowchart for a power loss process according to an embodiment.

FIG. 5 is a flowchart for a power loss process that can be performed by controller 120 executing DSD firmware 10 according to an embodiment. In block 502 an unexpected power loss is detected by controller 120. This may come from, for example, a notification from host 101, monitoring of a power supply of DSD 106, or an indication from power supply circuitry of DSD 106.

In block 504, controller 120 optionally stores PSWB log 16 in NVSM 128. As noted above, PSWB log 16 can provide a way to maintain coherency between PSWB 12 and disk 150 in the event of successive power losses where not all of the data from PSWB 12 can be written to disk 150 before a next power loss.

Figure 6A:
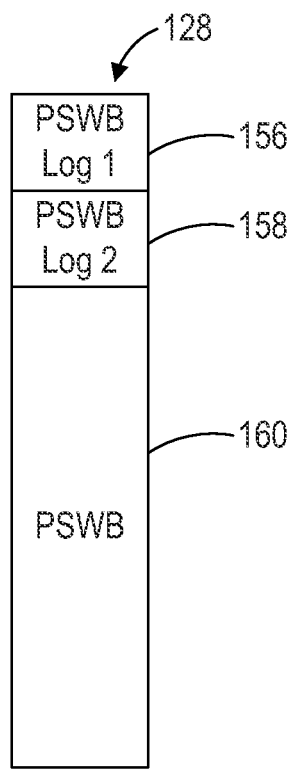
FIG. 6A illustrates segments of a Non-Volatile Solid-State Memory (NVSM) according to an embodiment.

With reference to the example of FIG. 6A, NVSM 128 can include first segment 156 for storing a first PSWB log (i.e., PSWB 1) after a first power loss and second segment 158 for storing a second PSWB log (i.e., PSWB 2) after a second power loss. During the first power loss, controller 120 can copy PSWB log 16 from volatile memory 140 to first segment 156 of NVSM 128 to record which data in PSWB 12 had been stored on disk 150 before the first power loss. In some implementations, PSWB log 16 can include addresses (e.g., logical block addresses) associated with data that has been stored on disk 150 or addresses for data not yet stored on disk 150.

In initializing DSD 106 after the first power loss, second segment 158 can be erased to make room for a new PSWB log in the event of another power loss. By only having to erase first segment 156 or second segment 158, a time to ready for DSD 106 is typically improved. The smaller size of either first segment 156 or second segment 158 when compared to third segment 160 allows first segment 156 or second segment 158 to be erased faster during initialization than third segment 160. Moreover, the ability to quickly erase either of first segment 156 or second segment 158 can help protect against an inconsistency between PSWB 12 and disk 150 if there is not enough time between power losses to erase third segment 160 to make room for storing a current state of PSWB 12.

After powering up, the PSWB log from first segment 156 can be evaluated to determine if any of the data stored in third segment 160 has already been stored on disk 150 so that such data is not rewritten to disk 150 or restored to PSWB 12 in volatile memory 140. As data is written to disk 150, PSWB log 16 is updated to reflect which data from third segment 160 has been written to disk 150. Once all of the data from third segment 160 has been written to disk 150, controller 120 can clear PSWB log 16 and erase the PSWB data from third segment 160.

On the other hand, if a second power loss occurs before all of the data restored from third segment 160 has been written on disk 150, PSWB log 16 can be stored in the previously erased second segment 158. After powering up from the second power loss, controller 120 can evaluate PSWB log 2 from second segment 158 when determining which PSWB data, if any, from third segment 160 should be restored to PSWB 12 or written to disk 150.

In other implementations, the size of PSWB 12 and/or the speed at which segments of NVSM 128 can be erased may allow for storing a current state of PSWB 12 without using PSWB log 16. In the implementation shown in FIG. 6B, NVSM 128 includes first segment 162 for storing a first instance of PSWB 12 after a first power loss and second segment 164 for storing a second instance of PSWB 12 after a second power loss. Although the example of FIG. 6B may require more overall space in NVSM 128 when compared to the example of FIG. 6A for the same size of PSWB 12, there is no need to maintain or store PSWB log 16.

Figure 6B:
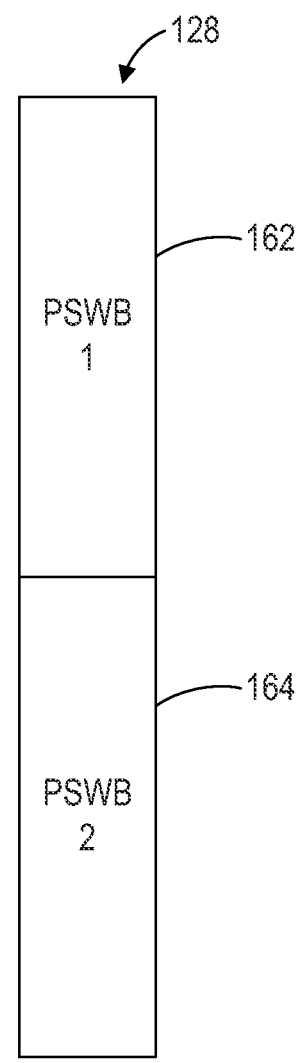
FIG. 6B illustrates segments of an NVSM according to another embodiment.

In the example of FIG. 6B, controller 120 erases one of first segment 162 or second segment 164 after powering up to make room for storing PSWB 12 in the event of another power loss. If another power loss follows, controller 120 can egress or copy the data from PSWB 12 to the free segment of first segment 162 or segment 164.

Returning to block 506 in the example power loss process of FIG. 5, controller 120 encrypts the data identified for inclusion in PSWB 12 for storage on disk 150. In some embodiments, encrypting the data for storage on disk 150 during the power loss process can allow controller 120 to write the encrypted data transferred to NVSM 128 directly to disk 150 after power-up of DSD 106.

In block 508, the data identified for inclusion in PSWB 12 is transferred from volatile memory 140 to NVSM 128. Controller 120 in block 508 may also transfer or store metadata in NVSM 128 including addresses (e.g., logical block addresses) for the identified data. In some implementations, this metadata can be used after a power-up following an unexpected power loss to write the data to disk 150.

Figure 7:
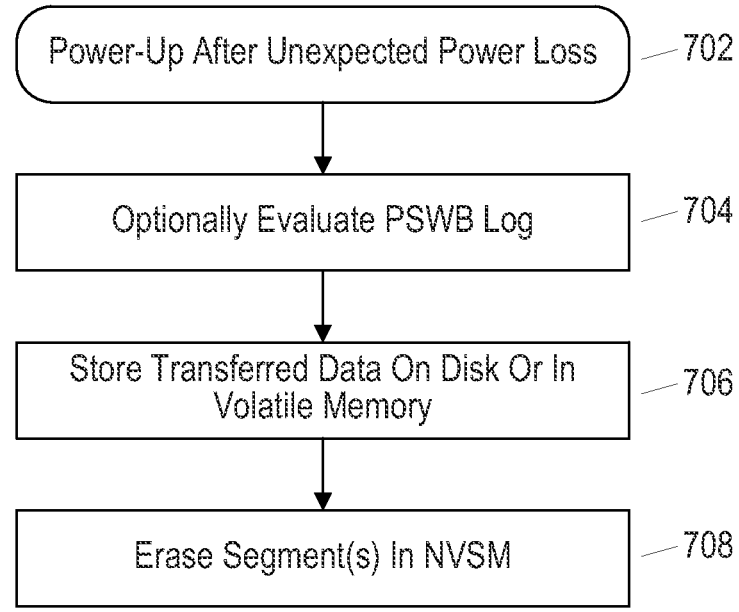
FIG. 7 is a flow chart for a power-up process according to an embodiment.

FIG. 7 is a flow chart for a power-up process that can be performed by controller 120 executing DSD firmware 10 according to an embodiment. In block 702, power is restored to DSD 106 after an unexpected power loss, and in block 704, controller 120 optionally evaluates a PSWB log stored in NVSM 128. As discussed above with reference to FIG. 6A, evaluating the PSWB log can help maintain coherency between data stored on disk 150 and data stored in PSWB 12 when there has been a second power loss soon after a first power loss. Controller 120 can evaluate the PSWB log to determine which PSWB data stored in NVSM 128 should be written to disk 150 or restored to PSWB 12 in volatile memory 140. In certain cases, block 704 may not need to be performed since the PSWB log may have already been cleared after all of the previous PSWB data restored from NVSM 128 had been stored on disk 150. In other implementations, block 704 can be omitted if PSWB log 16 is not used, as in the example of FIG. 6B discussed above.

In block 706, the PSWB data previously transferred to NVSM 128 (e.g., the PSWB data transferred in block 508 of FIG. 5) is stored on disk 150 or restored to PSWB 12 in volatile memory 140. In an implementation where the PSWB data is stored on disk 150, controller 120 stores the PSWB data on disk 150 before performing other commands involving the PSWB data to ensure coherency of the data.

In block 708, controller 120 erases at least one segment in NVSM 128. In the example of FIG. 6A, the erased segments can include first segment 156 or second segment 158 storing a PSWB log, and eventually segment 160 storing the PSWB data from a previous instance of PSWB 12. In the example of FIG. 6B, an erased segment can include segment 162 or segment 164 storing a previous instance of PSWB 12.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A method for managing data stored in a Data Storage Device (DSD), the method comprising:
   receiving data from a host into a volatile memory of the DSD for storage on a disk of the DSD;
   determining whether to identify the data received in the volatile memory for inclusion in a Power Safe Write Buffer (PSWB) based on an amount of data that can be transferred from the volatile memory to a Non-Volatile Solid-State Memory (NVSM) of the DSD after an unexpected power loss; and
   in response to identifying the data received in the volatile memory for inclusion in the PSWB:
      sending an indication to the host indicating storage of the identified data before storing the identified data on the disk;
      prioritizing the identified data in the volatile memory for storage on the disk over other data stored in a write cache of the volatile memory; and
      transferring the identified data from the volatile memory to the NVSM in the event of an unexpected power loss of the DSD before storing the identified data on the disk.

2. The method of claim 1 further comprising keeping track of an amount of data stored in the volatile memory that is identified for inclusion in the PSWB.

3. The method of claim 1, further comprising identifying additional data stored in the write cache of the volatile memory for inclusion in the PSWB.

4. The method of claim 1, wherein in determining whether to identify the data for inclusion in the PSWB, the method further comprises excluding data from the PSWB that is larger than a predetermined size or that is sequentially addressed beyond a predetermined number of addresses.

5. The method of claim 1, wherein in transferring the identified data from the volatile memory to the NVSM, the method further comprises storing metadata in the NVSM including addresses for the identified data.

6. The method of claim 1, wherein in transferring the identified data from the volatile memory to the NVSM, the method further comprises encrypting the identified data for storage on the disk.

7. The method of claim 1, wherein after power-up of the DSD following the unexpected power loss, the method further comprises storing on the disk the identified data that was transferred to the NVSM before performing other commands involving the identified data.

8. The method of claim 1, wherein after power-up of the DSD following the unexpected power loss, the method further comprises storing in the volatile memory the identified data transferred to the NVSM.

9. The method of claim 1, further comprising maintaining a PSWB log to indicate which of the identified data has been stored on the disk since power-up of the DSD after the unexpected power loss.

10. The method of claim 1, wherein the NVSM includes a first segment for storing identified data transferred from the volatile memory after a previous unexpected power loss and a second segment for storing identified data transferred from the volatile memory after a current unexpected power loss.

11. A method for managing data stored in a Data Storage Device (DSD), the method comprising:
   receiving data from a host into a volatile memory of the DSD for storage on a disk of the DSD;
   determining whether to identify the data received in the volatile memory for inclusion in a Power Safe Write Buffer (PSWB), wherein data that is larger than a predetermined size or that is sequentially addressed beyond a predetermined number of addresses is excluded from the PSWB; and
   in response to identifying the data received in the volatile memory for inclusion in the PSWB:
      sending an indication to the host indicating storage of the identified data before storing the identified data on the disk;
      prioritizing the identified data in the volatile memory for storage on the disk over other data stored in a write cache of the volatile memory; and
      transferring the identified data from the volatile memory to the Non-Volatile Solid-State Memory (NVSM) of the DSD in the event of an unexpected power loss of the DSD before storing the identified data on the disk.

12. A Data Storage Device (DSD), comprising:
   a disk for storing data;
   a volatile memory for temporarily storing data to be stored on the disk;
   a Non-Volatile Solid-State Memory (NVSM); and a controller configured to:
  receive data from a host into the volatile memory for storage on the disk;
  determine whether to identify the data received in the volatile memory for inclusion in a Power Safe Write Buffer (PSWB) based on an amount of data that can be transferred from the volatile memory to the NVSM after an unexpected power loss; and
  if the data received in the volatile memory is identified for inclusion in the PSWB:
    send an indication to the host indicating storage of the identified data before storing the identified data on the disk;
    prioritize the identified data in the volatile memory for storage on the disk over other data stored in a write cache of the volatile memory; and
    transfer the identified data from the volatile memory to the NVSM in the event of an unexpected power loss of the DSD before storing the identified data on the disk.

13. The DSD of claim 1, wherein the controller is further configured to keep track of an amount of data stored in the volatile memory that is identified for inclusion in the PSWB.

14. The DSD of claim 1, wherein the controller is further configured to identify additional data stored in the write cache of the volatile memory for inclusion in the PSWB.

15. The DSD of claim 1, wherein in determining whether to identify the data for inclusion in the PSWB, the controller is further configured to exclude data from the PSWB that is larger than a predetermined size or that is sequentially addressed beyond a predetermined number of addresses.

16. The DSD of claim 1, wherein in transferring the identified data from the volatile memory to the NVSM, the controller is further configured to store metadata in the NVSM including addresses for the identified data.

17. The DSD of claim 1, wherein in transferring the identified data from the volatile memory to the NVSM, the controller is further configured to encrypt the identified data for storage on the disk.

18. The DSD of claim 1, wherein after power-up of the DSD following the unexpected power loss, the controller is further configured to store on the disk the identified data that was transferred to the NVSM before performing other commands involving the identified data.

19. The DSD of claim 1, wherein after power-up of the DSD following the unexpected power loss, the controller is further configured to store in the volatile memory the identified data transferred to the NVSM.

20. The DSD of claim 1, wherein the controller is further configured to maintain a PSWB log to indicate which of the identified data has been stored on the disk since power-up of the DSD after the unexpected power loss.

21. The DSD of claim 1, wherein the NVSM includes a first segment for storing identified data transferred from the volatile memory after a previous unexpected power loss and a second segment for storing identified data transferred from the volatile memory after a current unexpected power loss.

22. A Data Storage Device (DSD), comprising:
  a disk for storing data;
  a volatile memory for temporarily storing data to be stored on the disk;
  a Non-Volatile Solid-State Memory (NVSM); and
  a controller configured to:
    receive data from a host into the volatile memory for storage on the disk;
    determine whether to identify the data received in the volatile memory for inclusion in a Power Safe Write Buffer (PSWB), wherein data that is larger than a predetermined size or that is sequentially addressed beyond a predetermined number of addresses is excluded from the PSWB; and
    if the data received in the volatile memory is identified for inclusion in the PSWB:
      send an indication to the host indicating storage of the identified data before storing the identified data on the disk;
      prioritize the identified data in the volatile memory for storage on the disk over other data stored in a write cache of the volatile memory; and
      transfer the identified data from the volatile memory to the NVSM in the event of an unexpected power loss of the DSD before storing the identified data on the disk.

23. A non-transitory computer readable medium storing computer executable instructions for managing data stored in a Data Storage Device (DSD), wherein when the computer executable instructions are executed by a controller, the computer executable instructions cause the controller to:
  receive data from a host into a volatile memory of the DSD for storage on a disk of the DSD;
  determine whether to identify the data received in the volatile memory for inclusion in a Power Safe Write Buffer (PSWB) based on an amount of data that can be transferred from the volatile memory to a Non-Volatile Solid-State Memory (NVSM) of the DSD after an unexpected power loss; and
  if the data received in the volatile memory is identified for inclusion in the PSWB:
    send an indication to the host indicating storage of the identified data before storing the identified data on the disk;
    prioritize the identified data in the volatile memory for storage on the disk over other data stored in a write cache of the volatile memory; and
    transfer the identified data from the volatile memory to the NVSM in the event of an unexpected power loss of the DSD before storing the identified data on the disk.

* * * * *